US008199712B2

(12) United States Patent
Qu et al.

(10) Patent No.: US 8,199,712 B2
(45) Date of Patent: Jun. 12, 2012

(54) SYSTEM AND A METHOD FOR SUPPORTING A PLURALITY OF MULTIPLE ACCESS TECHNOLOGY AND THE FRAME STRUCTURE THEREOF

(75) Inventors: Hongyun Qu, Shenzhen (CN); Sean Cai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 490 days.

(21) Appl. No.: 12/594,590

(22) PCT Filed: Jan. 2, 2008

(86) PCT No.: PCT/CN2008/000005
§ 371 (c)(1),
(2), (4) Date: Oct. 3, 2009

(87) PCT Pub. No.: WO2008/119231
PCT Pub. Date: Oct. 9, 2008

(65) Prior Publication Data
US 2010/0118810 A1      May 13, 2010

(30) Foreign Application Priority Data

Apr. 3, 2007   (CN) .......................... 2007 1 0073809

(51) Int. Cl.
*H04W 4/00* (2009.01)
(52) U.S. Cl. ....................................................... 370/329
(58) Field of Classification Search ................... 370/329
See application file for complete search history.

(56) References Cited

U.S. PATENT DOCUMENTS
2007/0253379 A1 * 11/2007 Kumar et al. ................. 370/338

FOREIGN PATENT DOCUMENTS
| CN | 1205816 A | 1/1999 |
| CN | 1697352 A | 11/2005 |
| WO | 2005/122425 A2 | 12/2005 |

* cited by examiner

*Primary Examiner* — Kenny Lin
(74) *Attorney, Agent, or Firm* — Kunzler Needham Massey & Thorpe

(57) ABSTRACT

A system and a method for supporting a plurality of multiple access technologies and the frame structure thereof, wherein, the method comprises the following steps: a base station sending a downlink frame which comprises at least one downlink multiple access zone, wherein each downlink multiple access zone supports one downlink multiple access technology and each downlink multiple access zone associates with one or more uplink multiple access zones supporting different uplink multiple access technologies; a terminal searching the synchronization signal of the downlink multiple access technology that it supports, and obtaining the uplink control message after establishing synchronization with the base station, and according to the information within the uplink control message, determining that there is the uplink multiple access technology that it supports, and performing initial network access according to the information of the initial access zone indicated in the uplink control message.

45 Claims, 7 Drawing Sheets

SYSTEM AND A METHOD FOR SUPPORTING A PLURALITY OF MULTIPLE ACCESS TECHNOLOGY AND THE FRAME STRUCTURE THEREOF

TECHNICAL FIELD

The present invention relates to the field of wireless communication, and specifically, to a system, a method and the frame structure thereof capable of supporting a plurality of multiple access technologies simultaneously in a wireless communication system.

BACKGROUND OF THE INVENTION

There exist a plurality of multiple access technologies in wireless communication system, such as code division multiple access (CDMA), frequency division multiple access (FDMA), time division multiple access (TDMA), and so on. With the development of wireless communication technology, new multiple access technologies including space division multiple access (SDMA) and orthogonal frequency division multiple access (OFDMA), are emerging continuously.

Each multiple access technology has its own features, wherein FDMA divides the total system bandwidth into several non-overlapped sub-bands, each of which is allocated to a user; TDMA divides each channel into several time slots, each of which is allocated to a user; and CDMA allocates to each user a pseudo random code with good auto-correlation and cross-correlation property, thus multiple users can simultaneously send signals within the same bandwidth. TDMA and CDMA generally use FDMA to divide their frequency band into smaller ones, and then perform time division or code division. SDMA utilizes space irrelevance to obtain multiple access capability.

As for these traditional multiple access technologies, since the base station and the terminal send signals with a single carrier frequency or on a narrow band, it is more suitable for supporting low-speed voice services. For high-speed data services, there is relatively severe inter-symbol interference in a single carrier frequency system or narrowband system, thus the requirement for the equalizer of receiver is higher. For those multiple access technologies which support conventional multi-carrier, it is required to use filter banks to separate signals at the receiver side. This kind of multiple access technologies are simple to implement, however, they have the disadvantage of low spectrum efficiency.

OFDMA, which supports high-speed data service, divides the channel band into different sub-channels, and several users can simultaneously send signals on different bands. An OFDMA system can effectively reduce inter-signal interference through serial-parallel conversion of the high-speed data, thus reduce the complexity of the receiver. Moreover, the OFDMA system utilizes orthogonality between the sub-carries to allow the spectrum of the sub-channels to overlap with each other, so that the usage of spectrum resource can be maximized. Compared with a single carrier system, however, the OFDMA system has relatively higher peak-to-average power ratio.

With the development of wireless communication technology, especially the development of multiple access technologies, categories of the wireless terminals as well as types of the services that can be supported are also greatly enriched. Besides all kinds of handheld terminals, the fixed terminals and the application of notebook computer are also an important part. Basically, because of their size and cost, the handheld terminals require smaller power consumption, thus traditional single-carrier multiple access technologies such as SC-FDMA (single carrier frequency division multiple access) can be applied to support low-speed voice service. The fixed terminals and notebook computers can use power supply or other stable power equipment, thus can provide the users with high-speed data services and as a result, the multiple access technology of OFDMA can be applied.

In the present wireless communication system, the base station only supports terminals with a single multiple access technology. For example, in a CDMA communication system, the base station only supports the terminals whose uplink and downlink both apply CDMA. In an IEEE (Institute of Electrical and Electronics Engineers) 802.16e system, the base station only supports the terminals whose uplink and downlink both apply OFDMA.

However, with the development of wireless communication technology, for different multiple access technologies, there is an increasing need for a communication system capable of supporting different multiple access technologies with the same carrier frequency.

SUMMARY OF THE INVENTION

The technical problem to be solved by the present invention is to offer a system and a method for supporting a plurality of multiple access technologies and the frame structure thereof, which can support a plurality of multiple access technologies with the same carrier frequency.

In order to solve the above technical problem, it is provided in the present invention a method for access of a terminal in a system supporting a plurality of multiple access technologies, comprising the following steps:

(a) a base station sending a downlink frame comprising at least one downlink multiple access zone, wherein each downlink multiple access zone supports one downlink multiple access technology, and each downlink multiple access zone associates with one or more uplink multiple access zones, and an uplink control message of each downlink multiple access zone comprises information of an uplink multiple access technology supported by the associated uplink multiple access zone and allocation information of a corresponding initial access zone, and an uplink frame is divided into at least two uplink multiple access zones supporting different uplink multiple access technologies;

(b) a terminal scanning downlink channels, searching synchronization signal of the downlink multiple access technology supported by the terminal, and after establishing synchronization with the base station, obtaining the uplink control message from the corresponding downlink multiple access zone, and according to the information within the uplink control message, determining that there is the uplink multiple access technology supported by the terminal, and performing initial network access according to the information of the initial access zone indicated in the uplink control message, otherwise rescanning the channels;

Furthermore, said uplink multiple access zones and downlink multiple access zones are divided according to time division or frequency division, and the uplink control message of each downlink multiple access zone further comprises information of the position and/or size of the associated uplink multiple access zone; and that said downlink multiple access zone associates with an uplink multiple access zone, refers to that there is a terminal which simultaneously supports the downlink multiple access technology corresponding to the downlink multiple access zone and the uplink multiple access technology corresponding to the associated uplink multiple access zone.

Furthermore, said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame.

Furthermore, the allocation information of the initial access zone corresponding to said uplink multiple access zone comprises one or any combination of the following: position of the initial access zone, size of the initial access zone and type of the uplink multiple access technology supported by the initial access zone.

Furthermore, terminals applying different uplink multiple access technologies use different initial access zones to perform the access, and each initial access zone is located in the corresponding uplink multiple access zone; or the initial access zone is located in the common zone of the uplink frame, and terminals applying a plurality of uplink multiple access technologies perform the access by using the same initial access zone.

Furthermore, if said downlink frame comprises a plurality of downlink multiple access zones, the relative position of each downlink multiple access zone is variable;

when the position of a downlink multiple access zone needs to be changed, the base station sends in advance the position change information, including the new position of the downlink multiple access zone in the frame and the frame where the change happens, in the downlink control message of the corresponding downlink multiple access zone;

the terminal communicates normally with the base station, and after the terminal receives the downlink control message of the downlink multiple access zone which contains the information to indicate the position change of the downlink multiple access zone in a subsequent frame, the terminal searches the synchronization signal in the frame in which the new downlink multiple access zone is located according to the indication and resumes the normal communication with the base station after the synchronization.

Furthermore, said base station sends the synchronization signal of each downlink multiple access technology in the synchronization channel of each downlink multiple access zone; or said base station sends synchronization signals to terminals of all the downlink multiple access technologies in the common synchronization zone of the downlink frame, and the synchronization signal of each downlink multiple access technology corresponds to one downlink multiple access zone.

Furthermore, said downlink multiple access technologies comprise one or more of the following: OFDMA, SC-FDMA and MC-TD-SCDMA; and said uplink multiple access technologies comprise at least two of the following: OFDMA, SC-FDMA and MC-TD-SCDMA.

The present invention also provides a method for the system supporting a plurality of multiple access technologies to implement downlink transmission, comprising the following steps:

(a) a base station sending a downlink frame comprising at least one downlink multiple access zone, wherein each downlink multiple access zone supports transmission with one downlink multiple access technology, and each downlink multiple access zone associates with one or more uplink multiple access zones, and an uplink control message of each downlink multiple access zone comprises information of the associated uplink multiple access zone, and a downlink control message of each downlink multiple access zone comprises resource allocation information of the zone, and an uplink frame is divided into at least two uplink multiple access zones supporting different uplink multiple access technologies;

(b) after accomplishing initial access, the terminal obtaining the downlink control message from the downlink multiple access zone corresponding to the downlink multiple access technology supported by the terminal, and receiving data sent by the base station in downlink according to the resource allocation information in the downlink control message;

Furthermore, said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame, and said uplink multiple access zones and downlink multiple access zones are divided according to time division or frequency division;

that said downlink multiple access zone associate with an uplink multiple access zones, refers to that there is a terminal which simultaneously supports the downlink multiple access technology corresponding to the downlink multiple access zone and the uplink multiple access technology corresponding to the associated uplink multiple access zone.

Furthermore, besides the resource allocation information of the zone, the downlink control message of each downlink multiple access zone further comprises position information and/or downlink transmission parameters of the downlink multiple access zone, and said resource allocation information further comprises one or any combination of the following parameters: positions, size, types, target addresses and transmission parameters of the downlink resource blocks, wherein the target address is used to indicate the terminal which receives data in the downlink resource block.

Furthermore, if said downlink frame comprises a plurality of downlink multiple access zones, the relative position of each downlink multiple access zone is variable; and when the position of a downlink multiple access zone needs to be changed, the base station sends in advance the position change information, including the new position of the downlink multiple access zone in the frame and the frame where the change happens, in the downlink control message of the corresponding downlink multiple access zone; and after receiving the downlink control message of the downlink multiple access zone which contains the information to indicate the position change of the downlink multiple access zone in a subsequent frame, the terminal searches synchronization signal in the frame in which the new downlink multiple access zone is located according to the indication, and resumes the normal communication with the base station after the synchronization.

Furthermore, said downlink multiple access technologies comprise one or more of the following: OFDMA, SC-FDMA and MC-TD-SCDMA; and said uplink multiple access technologies comprise at least two of the following: OFDMA, SC-FDMA and MC-TD-SCDMA.

The present invention also provides a method for the system supporting a plurality of multiple access technologies to implement uplink transmission, comprising the following steps:

(a) a base station sending a downlink frame comprising at least one downlink multiple access zone, wherein each downlink multiple access zone supports transmission with one downlink multiple access technology, and each downlink multiple access zone associates with one or more uplink multiple access zones, and an uplink control message of each downlink multiple access zone comprises resource allocation information of the associated uplink multiple access zone, and an uplink frame is divided into at least two uplink multiple access zones supporting different uplink multiple access technologies;

(b) after accomplishing initial access, a terminal obtaining the uplink control message from the downlink multiple access zone corresponding to the downlink multiple access technology supported by the terminal, and uses the uplink multiple access technology of the terminal to perform uplink transmission in an available resource block according to the resource allocation information within the message;

Furthermore, said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame;

that said downlink multiple access zone associates with an uplink multiple access zone, refers to that there is a terminal which simultaneously supports the downlink multiple access technology corresponding to the downlink multiple access zone and the uplink multiple access technology corresponding to the associated uplink multiple access zone.

Furthermore, besides the resource allocation information of the associated uplink multiple access zone, said uplink control message further comprises one or any combination of the following information of the associated uplink multiple access zone: information of the uplink multiple access technology supported, position and size, wherein said resource allocation information comprises one or any combination of the following parameters: positions, size, types, target addresses and transmission parameters of the uplink resource blocks, and the target address is used to indicate the terminal which implements uplink transmission in the uplink resource block.

Furthermore, the relative positions of the plurality of uplink multiple access zones in said uplink frame are variable;

when the position of an uplink multiple access zone needs to be changed, the base station sends the position change information of the uplink multiple access zone in the uplink control message of the corresponding downlink multiple access zone, indicating the new position of the uplink multiple access zone in the current frame;

after receiving the new position information of the uplink multiple access zone in the current frame indicated in the uplink control message of the downlink multiple access zone, the terminal sends uplink signals in the new uplink multiple access zone.

Furthermore, said downlink multiple access technologies comprise one or more of the following: OFDMA, SC-FDMA and MC-TD-SCDMA; and said uplink multiple access technologies comprise at least two of the following: OFDMA, SC-FDMA and MC-TD-SCDMA.

The present invention also provides a system frame structure for supporting a plurality of multiple access technologies, comprising a downlink frame and an uplink frame, said downlink frame comprising at least one downlink multiple access zone, each downlink multiple access zone supporting one downlink multiple access technology, said uplink frame comprising at least two uplink multiple access zones supporting different uplink multiple access technologies, each downlink multiple access zone associating with one or more uplink multiple access zones.

Furthermore, said downlink frame comprises one downlink multiple access zone which associates with a plurality of uplink multiple access zones in the uplink frame, or said downlink frame comprises at least two downlink multiple access zones, each of which associates with one or more uplink multiple access zones in the uplink frame;

said downlink multiple access zone associating with an uplink multiple access zone, refers to that there is a terminal which simultaneously supports the downlink multiple access technology corresponding to the downlink multiple access zone and the uplink multiple access technology corresponding to the associated uplink multiple access zone, and an uplink control message of each downlink multiple access zone comprises information of the associated uplink multiple access zone.

Furthermore, said uplink frame further comprises initial access zones, and an initial access zone is located in a corresponding uplink multiple access zone, or the initial access zone is located in the common zone of the uplink frame.

Furthermore, information of the associated uplink multiple access zone in said uplink control message comprises one or any combination of the following information: allocation information of the corresponding initial access zone, information of the uplink multiple access technology information supported, position, size, transmission parameters and resource allocation information of the associated uplink multiple access zone, wherein, the resource allocation information comprises one or any combination of the following parameters: positions, size, target addresses and transmission parameters of the uplink resource blocks, and the target address is used to indicate a terminal which implements uplink transmission in the uplink resource block.

Furthermore, said downlink multiple access technologies comprise one or more of the following: OFDMA, SC-FDMA and MC-TD-SCDMA; and said uplink multiple access technologies comprise at least two of the following: OFDMA, SC-FDMA and MC-TD-SCDMA.

Furthermore, a synchronization channel of each downlink multiple access zone comprises synchronization signal of the corresponding downlink multiple access technology; or a common synchronization channel zone of the downlink frame comprises synchronization signals of all the downlink multiple access technologies, and the synchronization signal of each downlink multiple access technology corresponds to a downlink multiple access zone.

The present invention also provides a system for supporting a plurality of multiple access technologies comprising a base station and a terminal, wherein, said base station is configured to send a downlink frame comprising at least one downlink multiple access zone, and each downlink multiple access zone supports transmission with one downlink multiple access technology, and each downlink multiple access zone associates with one or more uplink multiple access zones, and an uplink control message of each downlink multiple access zone comprises information of an uplink multiple access technology supported by the associated uplink multiple access zone, allocation information of the corresponding initial access zone, and resource allocation information of the uplink multiple access zone associated with the downlink multiple access zone, and a downlink control message of each downlink multiple access zone comprises the resource allocation information of the downlink multiple access zone, and an uplink frame is divided into at least two uplink multiple access zones supporting different uplink multiple access technologies;

said terminal is configured to scan downlink channels, searching synchronization signal of the downlink multiple access technology supported by the terminal, and after establishing synchronization with the base station, to obtain the uplink control message from the corresponding downlink multiple access zone, for example, the terminal determines that the system supports the uplink multiple access technology of the terminal, and performs initial network access according to the information of the initial access zone indicated in the uplink control message, and then obtains the downlink control message and the uplink control message from the downlink multiple access zone corresponding to the downlink multiple access technology supported by the terminal, and receives the data sent from the base station in downlink according to the resource allocation information in the message, and performs uplink transmission in an available resource block by using the uplink multiple access technology of the terminal.

Furthermore, said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame, said uplink multiple access zones and downlink multiple access zones are divided according to time division or frequency division;

that said downlink multiple access zone associates with an uplink multiple access zone, refers to that there is a terminal which simultaneously supports the downlink multiple access technology corresponding to the downlink multiple access zone and the uplink multiple access technology corresponding to the associated uplink multiple access zone.

Furthermore, when the base station needs to change the position of a downlink multiple access zone, the base station sends in advance the position change information in the downlink control message of the corresponding downlink multiple access zone, and the information comprises the new position of the downlink multiple access zone in the frame and the frame where the change happens;

the terminal communicates normally with the base station, and after receiving the downlink control message of the downlink multiple access zone which contains the information to indicate the position change of the downlink multiple access zone in a subsequent frame, the terminal searches the synchronization signal in the frame in which the new downlink multiple access zone is located according to the indication, and resumes the normal communication with the base station after the synchronization.

Furthermore, said base station sends the synchronization signal of each downlink multiple access technology in a synchronization channel of each downlink multiple access zone; or the base station sends synchronization signals to terminals of all the downlink multiple access technologies in a common synchronization zone of the downlink frame, and the synchronization signal of each downlink multiple access technology corresponds to a downlink multiple access zone.

Furthermore, in the allocation information of the initial access zone in the uplink control message of each downlink multiple access zone of the base station, each uplink multiple access zone comprises one initial access zone, or the initial access zone is located in a common zone of the uplink frame, and terminals applying a plurality of uplink multiple access technologies can perform the access by using the same initial access zone.

Furthermore, said downlink multiple access technologies supported by the downlink multiple access zones in the downlink frame sent by the base station comprise one or more of the following: OFDMA, SC-FDMA and MC-TD-SCDMA; and said uplink multiple access technologies supported by the uplink multiple access zones in the received uplink frame comprise at least two of the following: OFDMA, SC-FDMA and MC-TD-SCDMA.

With the method described in the present invention, a single communication system can support a plurality of multiple access technologies within a single frequency band.

PREFERRED EMBODIMENTS OF THE PRESENT INVENTION

The system for supporting a plurality of multiple access technologies in present invention comprises a base station and terminals, wherein:

The base station is configured to send control information and data to one or more terminals supporting different multiple access technologies, and to receive the data sent by the terminals supporting different multiple access technologies. Specifically, the base station sends a downlink frame which comprises at least one downlink multiple access zone, and each downlink multiple access zone supports transmission with one type of downlink multiple access technology, while the uplink frame sent by the terminals comprises at least two uplink multiple access zones supporting different uplink multiple access technologies, and each of the downlink multiple access zone associates with one or more uplink multiple access zones, wherein an uplink control message of each downlink multiple access zone comprises allocation information of the initial access zone corresponding to the associated uplink multiple access zone.

The terminal is configured to receive the control message sent by the base station and to receive the data sent by the base station according to the control message, and if the base station supports the multiple access technology of it, the terminal sends data to the base station according to the control message. Specifically, the terminal scans its downlink channels, searching the synchronization signal of the downlink multiple access technology that it supports, and after it establishes synchronization with the base station, the terminal obtains the uplink control message from the corresponding downlink multiple access zone, and if the base station supports its uplink multiple access technology, the terminal uses the initial access technology that it supports to perform initial network access according to the initial access zone information indicated in the uplink control message.

The present invention will be described in further detail in combination with the accompanying drawings and embodiments which are not be considered as limitations to the present invention.

THE FIRST EMBODIMENT

Within the same carrier frequency, the base station supports one downlink multiple access technology and more than one uplink multiple access technology. In this embodiment, the base station supports OFDMA in downlink, and supports OFDMA and SC-FDMA in uplink. For example, terminal #1 supports OFDMA in downlink and supports OFDMA in uplink; while terminal #2 supports OFDMA in downlink and supports SC-FDMA in uplink; and other terminals support OFDMA in downlink, and support OFDMA or SC-FDMA in uplink.

Figure 1:
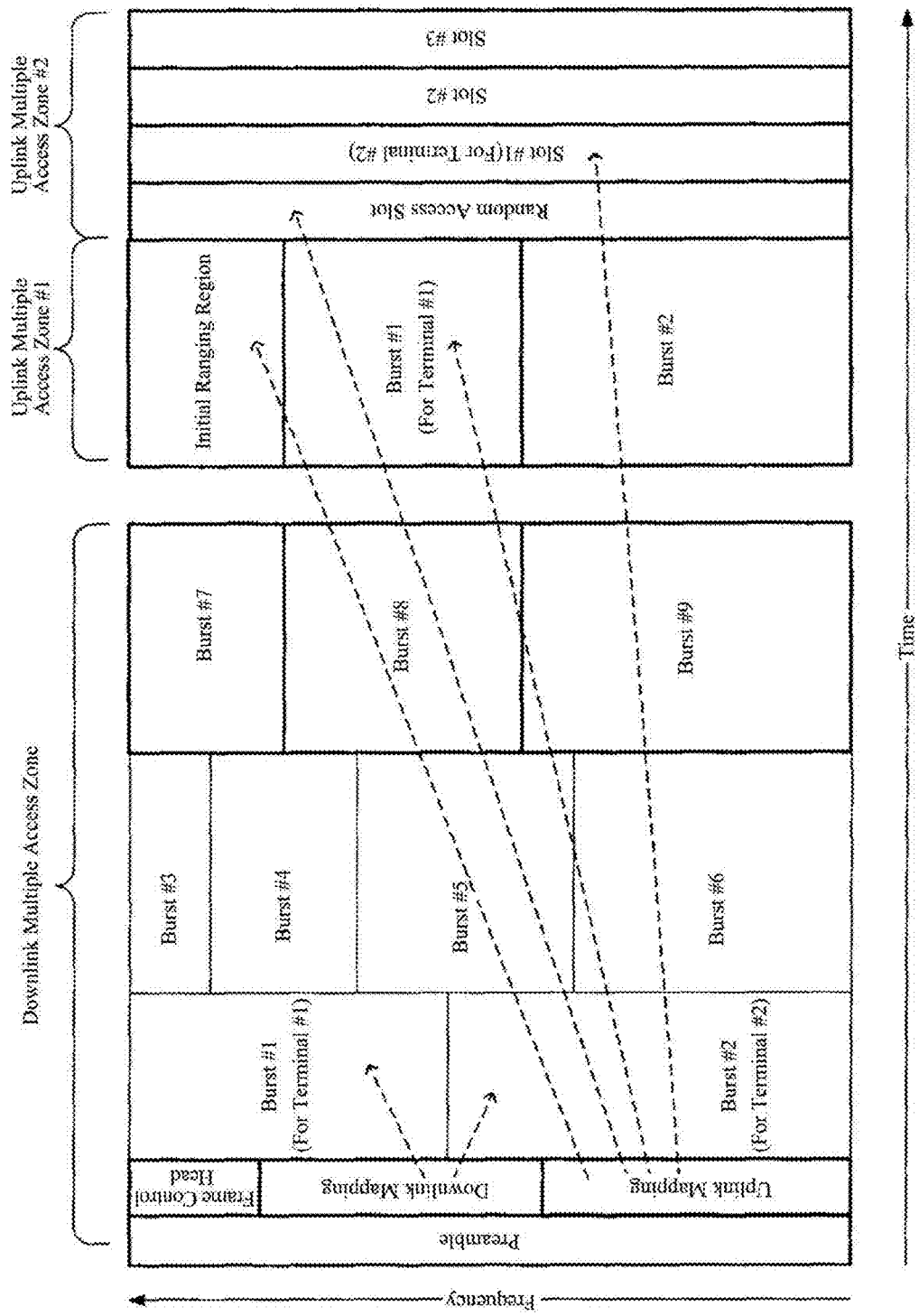
FIG. 1 is a schematic drawing of the frame structure in the system for implementing the first embodiment of the present invention.

The frame structure to implement this embodiment is shown in FIG. 1, which comprises a downlink frame and an uplink frame. The downlink frame comprises only one downlink multiple access zone (DL Zone), which supports only one downlink multiple access technology, that is, downlink OFDMA. The uplink frame is divided according to time division or frequency division into two uplink multiple access zones supporting different uplink multiple access technologies respectively. In this embodiment, uplink multiple access zone #1 (UL Zone #1) supports uplink OFDMA and uplink multiple access zone #2 (UL Zone #2) supports uplink SC-FDMA. The downlink multiple access zone #1 associates with the uplink multiple access zone #1 and zone #2.

As shown in FIG. 1, the base station sends a preamble at the beginning of the downlink frame and sends an uplink control message and a downlink control message to the terminal in the downlink multiple access zone. Wherein, the downlink control message comprises FCH (Frame Control Head) and DL-MAP (downlink mapping) messages, and may also comprise DCD (downlink channel description) message, while the uplink control message comprises UL-MAP (uplink mapping) message, and may also comprise UCD (uplink channel description) message or other broadcast control messages (DCD and UCD are not shown in FIG. 1).

The downlink control message of the base station comprises: parameters related to the downlink transmission, and resource allocation information of the downlink multiple access zone, and may also comprise the position information or updating information of the downlink multiple access zone in the downlink frame. Wherein, parameters related to the downlink transmission comprise identifier of the base station, parameters of the basic capabilities of the base station, bandwidth, FFT size, frame length and definition of the timers used in the downlink transmission, and so on (Parameters related to the uplink transmission also comprise the listed parameters above); The resource allocation information of the downlink multiple access zone comprises one or any combination of the following parameters: the positions, size, types, target addresses (used to indicate the terminals that receive data in the downlink resource blocks, such as the identifiers of the target terminals), and transmission parameters (such as the modulation and coding mode applied in transmission) of all the bursts in the downlink. As shown in FIG. 1, the downlink control message DL-MAP comprises all the allocation information of burst #1 to burst #9, wherein burst #1 is sent to terminal #1 (MS #1), burst #2 is sent to terminal #2 (MS #2), and other bursts are also indicated to the terminals of the system, including terminal #1 and terminal #2, and there may be more such bursts.

The uplink control message of the base station includes the information of all the uplink multiple access technologies supported by the base station (such as types of the uplink multiple access technologies) and parameters related to the uplink transmission (such as bandwidth and FFT size used in uplink transmission), and may also include the position information and resource allocation information of each uplink multiple access zone. Since the relative position and size of each uplink multiple access zone is variable between the frames, the position information need to be notified to the terminal when it is updated. Said position information of the uplink multiple access zones comprises the position of each uplink multiple access zone (such as uplink multiple access zone #1 and uplink multiple access zone #2 in FIG. 1) in the uplink frame and/or size of the uplink multiple access zone. Said allocation information of the uplink multiple access zones comprises the allocation information of the bursts or slots in each uplink multiple access zone, comprising one or any combination of the following parameters: position of each burst or slot, target address of the uplink burst or slot (indicating the terminal that performs uplink transmission in the burst/slot), size of the burst or slot, type of the burst or slot (indicating what kind of data is carried in the burst or slot), and the modulation and coding mode applied in transmission. As shown in FIG. 1, it is indicated in the uplink control message UL-MAP that the position and target address of the uplink burst #1 in uplink multiple access zone #1, which is allocated to terminal #1 for uplink transmission; as well as the position information and target address of uplink slot #1 in uplink multiple access zone #2, which is allocated to terminal #2 for uplink transmission.

The uplink control message of the base station also carries allocation information of the initial access zones, and there is at least one initial access zone. The allocation information of the initial access zones comprises allocation information of the uplink initial access zone (such as Initial ranging region and random access slot) within each uplink multiple access zone, and the allocation information comprises one or any combination of the following parameters: position and size of the uplink initial access zone in the uplink frame or in each uplink multiple access zone, type identifier of the uplink multiple access technology supported by the uplink initial access zone, modulation and coding mode applied in transmission, and so on. In the uplink control message, terminal of each uplink multiple access technology is allocated an initial access zone in an uplink multiple access zone, and as shown in FIG. 1, initial ranging region and random access slot of uplink multiple access zone #1 and uplink multiple access zone #2 are used for terminal #1 and terminal #2 to initially access to the network by using different initial network access technologies, respectively. However, the initial access zones of the terminals may be the same, and when terminal #1 and terminal #2 use the same initial network access method to initially access to the network, the base station may allocate an initial access zone in the common zone of the uplink frame to the terminals supporting the same uplink multiple access technology.

Figure 2:
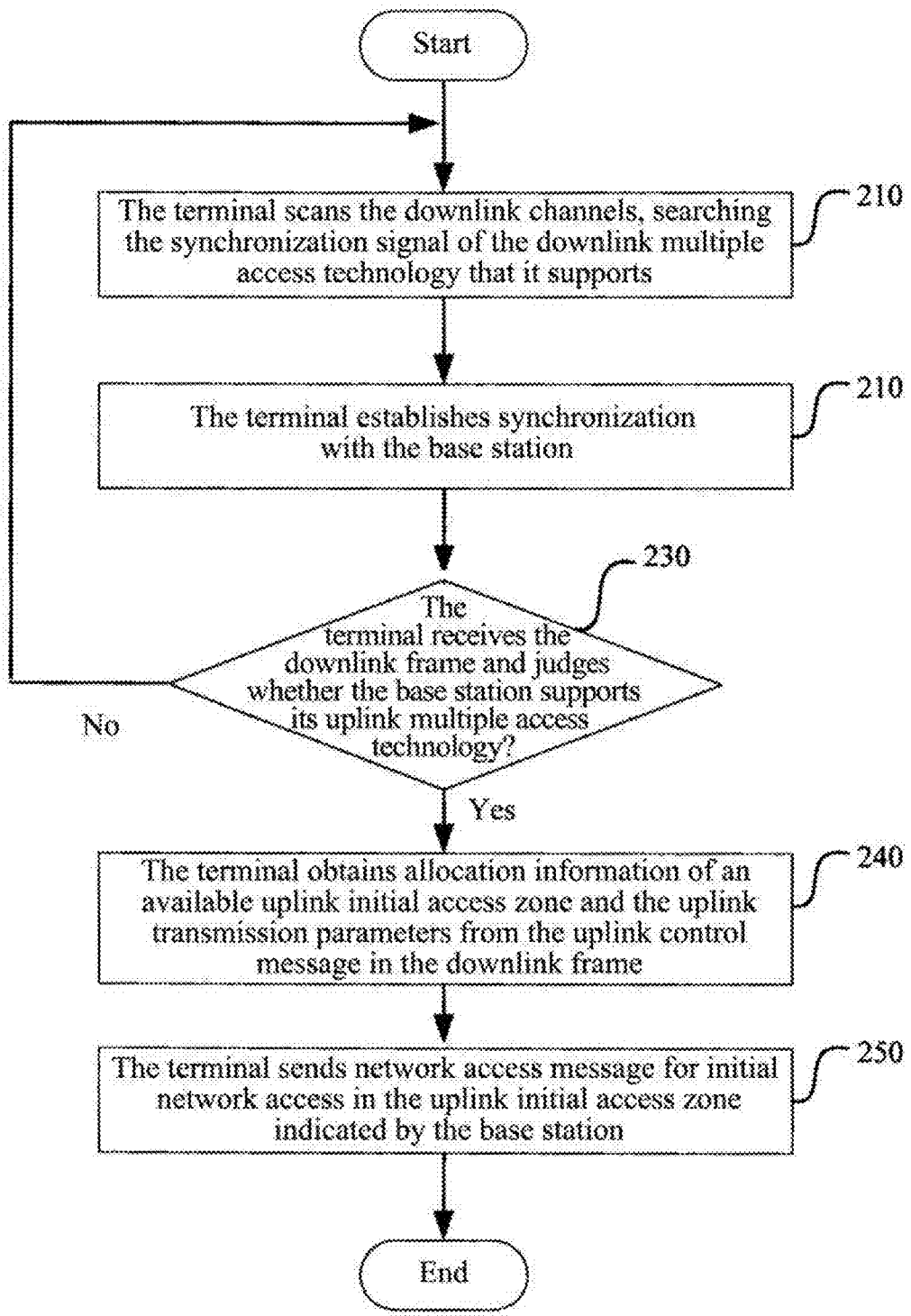
FIG. 2 is a flow chart of the initial network access of the terminal in the system applying the first embodiment.

Process of the initial network access of the terminal is shown in FIG. 2, which comprises the following steps:

Step 210, the terminal scans downlink channels, searching the synchronization signal of the downlink multiple access technology that it supports;

In this embodiment, the system applies OFDMA in downlink, and terminal #1 and terminal #2 search the preamble of the downlink frame shown in FIG. 1. If the base station supports n different modes of downlink access, there will be n synchronization signals in the downlink frame for the downlink network access of the terminals. And if the system applies another multiple access technology in downlink, the terminal will search the corresponding synchronization signal which may be synchronization channel signal or other synchronization signal besides preamble signal.

Step 220, the terminal establishes synchronization with the base station;

Step 230, after the terminal synchronizes with the base station, it receives the downlink frame sent by the base station and obtains the uplink control message in the frame, and determines whether the base station supports its uplink multiple access technology or not according to the identifiers of the uplink multiple access technologies supported by the base station obtained from the uplink control message, and if yes, proceeds to step 240, otherwise, ends or returns to step 210;

In this embodiment, terminal #1 need to determine whether the base station supports uplink OFDMA, and terminal #2 need to determine whether the base station supports uplink SC-FDMA. The terminal determines whether the base station supports its uplink multiple access technology by checking whether the obtained identifiers of the uplink multiple access technologies supported by the base station match the identifier of the multiple access technology supported by the terminal, and if the terminal determines that the base station does not support its uplink multiple access technology, it rescans the downlink frequency band, searching a new available downlink channel.

Step 240, the terminal obtains uplink control message from the downlink frame of the base station, and obtains the allocation information of an available uplink initial access zone as well as the information of uplink transmission parameters from the uplink control message;

Step 250, the terminal sends network access message in the uplink initial access zone indicated by the base station for initial network access.

Terminal #1 and Terminal #2 use different initial technologies in initial access zone #1 and initial access zone #2 respectively for initial network access according to the received information of initial access zones in the uplink control message of the base station.

Figure 3:
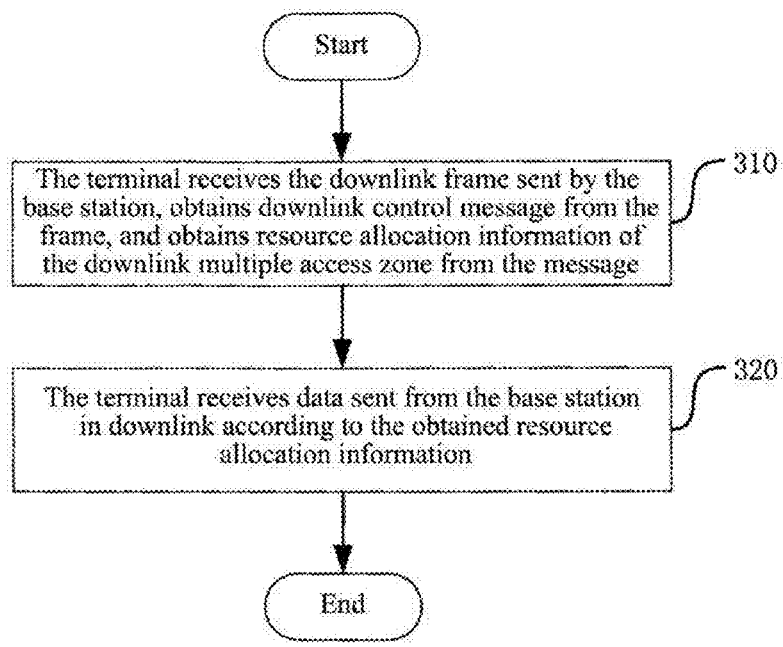
FIG. 3 is a flow chart of the downlink receiving of the terminal in the system applying the first embodiment.

After the terminal accesses to the network, process of receiving downlink data from the base station is shown as FIG. 3, which comprises the following steps:

Step 310, the terminal receives the downlink frame sent by the base station and obtains the downlink control message in the frame, and then obtains the resource allocation information of the downlink multiple access zone from the downlink control message;

Terminal #1 and terminal #2 receive the downlink control message of the base station, which is DL-MAP message in this embodiment, and obtain the resource allocation information of the downlink multiple access zone from the message.

Step 320, the terminal receives data sent by the base station in downlink according to the obtained resource allocation information.

Terminal #1 and terminal #2 obtain the positions of the data sent to them by the base station and the relative information (such as modulation and coding mode) according to the resource allocation information of the downlink multiple access zone, and as shown in FIG. 1, the downlink control message DL-MAP of the base station indicates that data are sent to terminal #1 in downlink burst #1, and data are sent to terminal #2 in downlink burst #2, thus terminal #1 and terminal #2 receive data in burst #1 and burst #2 respectively according to the position information of the bursts and other parameters.

When the terminal communicates normally with the base station, if the position of a downlink multiple access zone in the downlink frame needs to be changed, the base station should send in advance the position change information in the downlink control message of the downlink multiple access zone, and the information comprises the new position of the downlink multiple access zone in the downlink frame and the frame where the change happens. The terminal receives information of the new position of the downlink zone from the downlink control message and performs synchronization in a new frame, and then resumes the normal communication with the base station.

Figure 4:
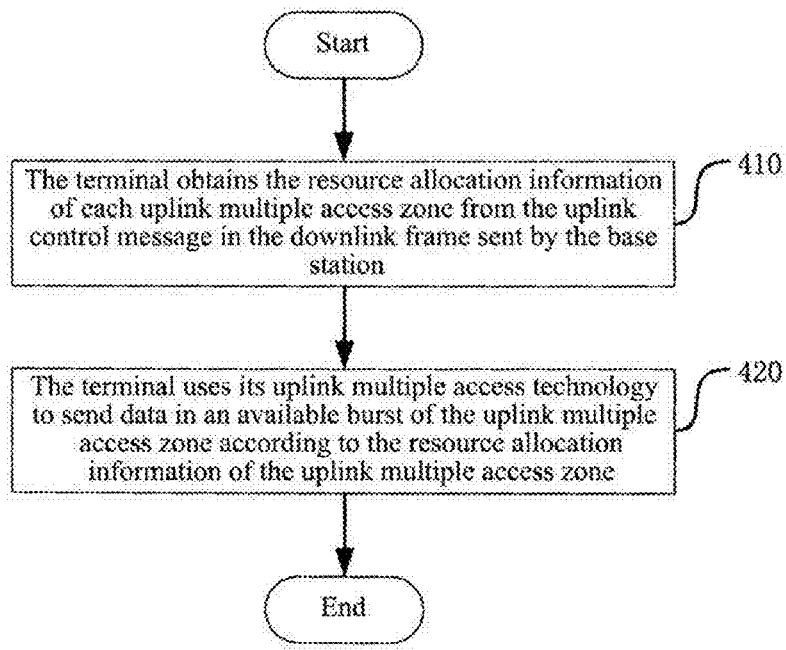
FIG. 4 is a flow chart of the uplink transmitting of the terminal in the system applying the first embodiment.

After the terminal accesses to the network, process of the data transmission in uplink is shown as FIG. 4, which comprises the following steps:

Step 410, the terminal obtains the resource allocation information of each uplink multiple access zone from the uplink control message in the downlink frame sent by the base station;

The uplink multiple access technology applied in the uplink multiple access zone is supported by the terminal.

Step 420, the terminal uses its uplink multiple access technology to send data in an available uplink burst of the uplink multiple access zone according to the resource allocation information of the uplink multiple access zone.

Terminal #1 and terminal #2 obtain the positions of the uplink bursts allocated to them and the relative information according to the resource allocation information of the respective uplink multiple access zones. As shown in FIG. 1, the base station allocates burst #1 in uplink multiple access zone #1 to terminal #1 in uplink control message UL-MAP and allocates uplink slot #1 in uplink multiple access zone #2 to terminal #2 in uplink control message UL-MAP. Terminal #1 and terminal #2 use the uplink multiple access technologies that they support to perform uplink transmission in uplink burst #1 and uplink slot #1 respectively according to the indication of the message.

THE SECOND EMBODIMENT

In the same carrier frequency, the base station supports two downlink multiple access technologies and two uplink ones. Specifically in this embodiment, the base station supports the multiple access technologies of downlink OFDMA, downlink SC-FDMA, uplink OFDMA and uplink SC-FDMA. The system also comprises terminal #1 and terminal #2, wherein, terminal #1 supports downlink OFDMA and uplink OFDMA; and terminal #2 supports downlink SC-FDMA and uplink SC-FDMA.

Figure 5:
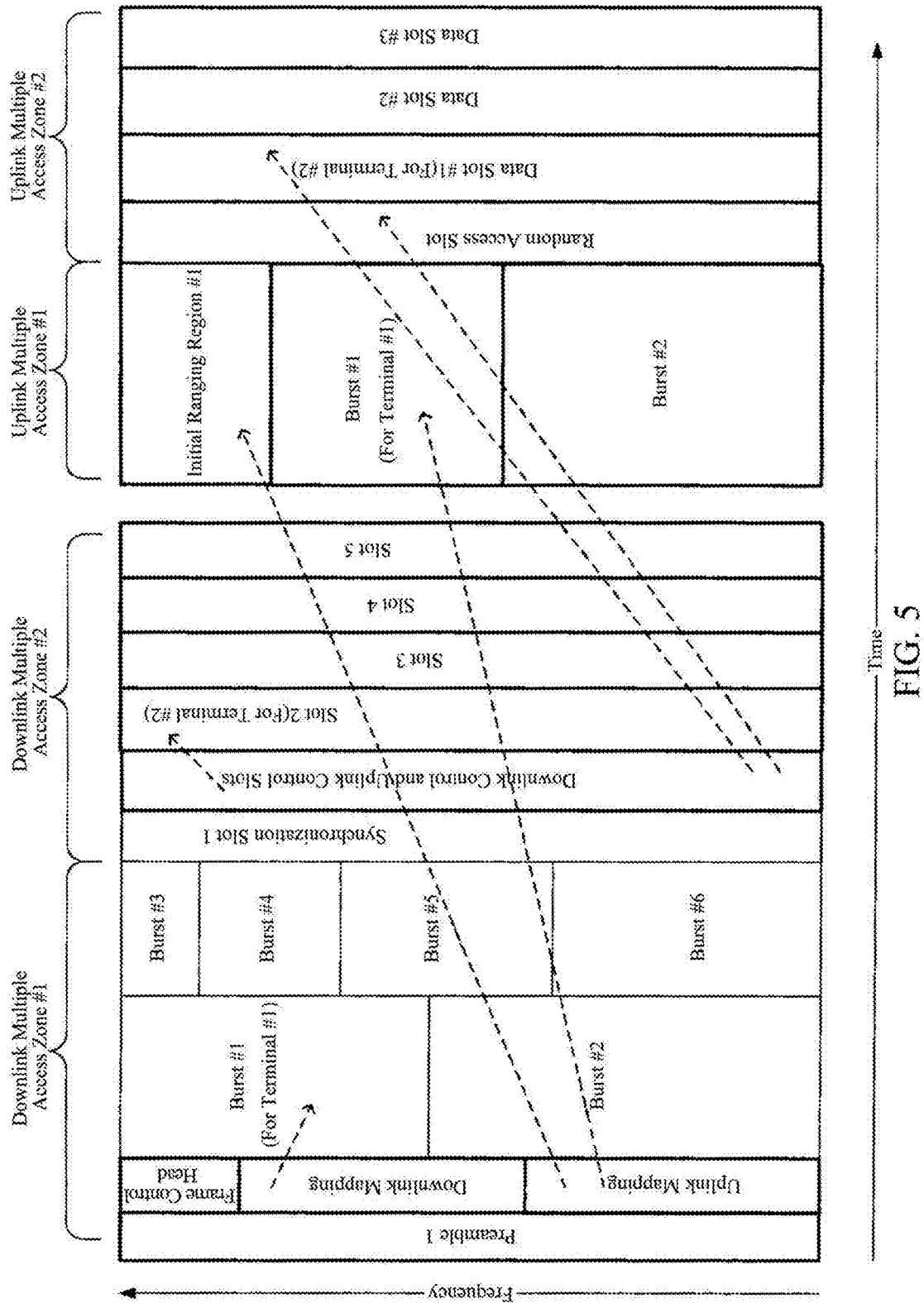
FIG. 5 is a schematic drawing of the frame structure in the system for implementing the second embodiment.

The frame structure to implement this embodiment is shown in FIG. 5, which comprises a downlink frame and an uplink frame. The downlink frame and uplink frame are divided respectively into two downlink multiple access zones and two uplink multiple access zones according to time division or frequency division, wherein each downlink multiple access zone supports one downlink multiple access technology, and each uplink multiple access zone supports one uplink multiple access technology. The relative position of each downlink multiple access zone in the downlink frame is variable, so is the relative position of each uplink multiple access zone in the uplink frame. Downlink multiple access zone #1 and downlink multiple access zone #2 support OFDMA and SC-FDMA respectively, and uplink multiple access zone #1 and uplink multiple access zone #2 support OFDMA and SC-FDMA respectively. The two downlink multiple access zones associate with the two uplink multiple access zones, wherein, downlink multiple access zone #1 associates with uplink multiple access zone #1 and downlink multiple access zone #2 associates with uplink multiple access zone #2. A downlink multiple access zone associates with an uplink multiple access zone in a way that there is a terminal which simultaneously supports the downlink multiple access technology corresponding to the downlink multiple access zone and the uplink multiple access technology corresponding to the associated uplink multiple access zone.

The base station sends preamble #1 and synchronization slot #1 (Sync Slot 1) at the beginning of downlink multiple access zone #1 and downlink multiple access zone #2 respectively to support the initial network search and synchronization of the terminals supporting downlink OFDMA and downlink SC-FDMA respectively.

The base station sends in each downlink multiple access zone the respective control message of the downlink multiple access zone, which comprises downlink control message and uplink control message. The downlink control message and the uplink control message are used to control the downlink multiple access zone and the corresponding uplink multiple access zone respectively.

The uplink control message sent in each downlink multiple access zone comprises information of the uplink multiple access technology, uplink transmission parameters, position information, resource allocation information, and the allocation information of the initial access zone. Wherein, position information of said uplink multiple access zone comprises the position and/or size of each uplink multiple access zone in the uplink frame; and the resource allocation information of each uplink multiple access zone may comprise one or any combination of the following parameters: the position information of the uplink bursts or slots in each multiple access zone, size and types of the uplink bursts or slots, target addresses of the uplink bursts or slots, and the modulation and coding mode applied in transmission. The target address of said uplink burst or slot is used to indicate the terminal which performs uplink transmission in the burst or slot. The uplink control message also comprises allocation information of the initial access zone which is used for the initial network access of the terminal supporting the uplink multiple access technology.

The downlink control message sent in each downlink multiple access zone comprises transmission parameters of the downlink multiple access zone and the resource allocation information of the downlink multiple access zone. When the position of a downlink multiple access zone in the downlink frame needs to be changed, the base station sends in advance the position change information in the downlink control message of the downlink multiple zone, and the information comprises the new position of the downlink multiple access zone in the downlink frame and the frame where the change happens.

As shown in FIG. 5, in downlink multiple access zone #1 supporting OFDMA, the position information and resource allocation information of downlink multiple access zone #1 and the corresponding uplink multiple access zone #1 are sent respectively by the downlink control message DL-MAP and uplink control message UL-MAP. The resource allocation information of the downlink multiple access zone in the downlink control message DL-MAP comprises one or any combination of the following: positions of all the bursts in the downlink multiple access zone, target terminals of the bursts, size of the bursts, and the modulation and coding method used for transmission, and so on. As shown in FIG. 5, the downlink control message indicates that burst #1 is allocated to terminal #1. The position information of the uplink multiple access zone in the uplink control message UL-MAP indicates the position and/or size of the uplink multiple access zone in the uplink frame; and the resource allocation information of the uplink multiple access zone comprises one or any combination of the following: positions of all the bursts in the uplink multiple access zone associated with the downlink multiple access zone, which terminals they are allocated to, size of the bursts, the modulation and coding method applied, and so on. As shown in FIG. 5, the uplink control message indicates that uplink burst #1 is used by terminal #1 for uplink transmission. The uplink control message UL-MAP may also comprise the allocation information of the initial access zone (Initial Ranging region and Random Access slot). Moreover, when the position and/or size of uplink multiple access zone #1 need to be changed, the base station sends the position change information in the uplink control message of the downlink multiple access zone #1.

As shown in FIG. 5, in downlink multiple access zone #2 supporting SC-FDMA, the position information and resource allocation information of downlink multiple access zone #2 and the corresponding uplink multiple access zone #2 are sent respectively by the downlink control slot and uplink control slot. In the downlink control slot of downlink multiple access zone #2, downlink data slot #2 is allocated to terminal #2, and terminal #2 performs data reception in the slot using uplink SC-FDMA; and in the uplink control slot of downlink multiple access zone #2, positions of the initial access channel and data channel are allocated.

Figure 6:
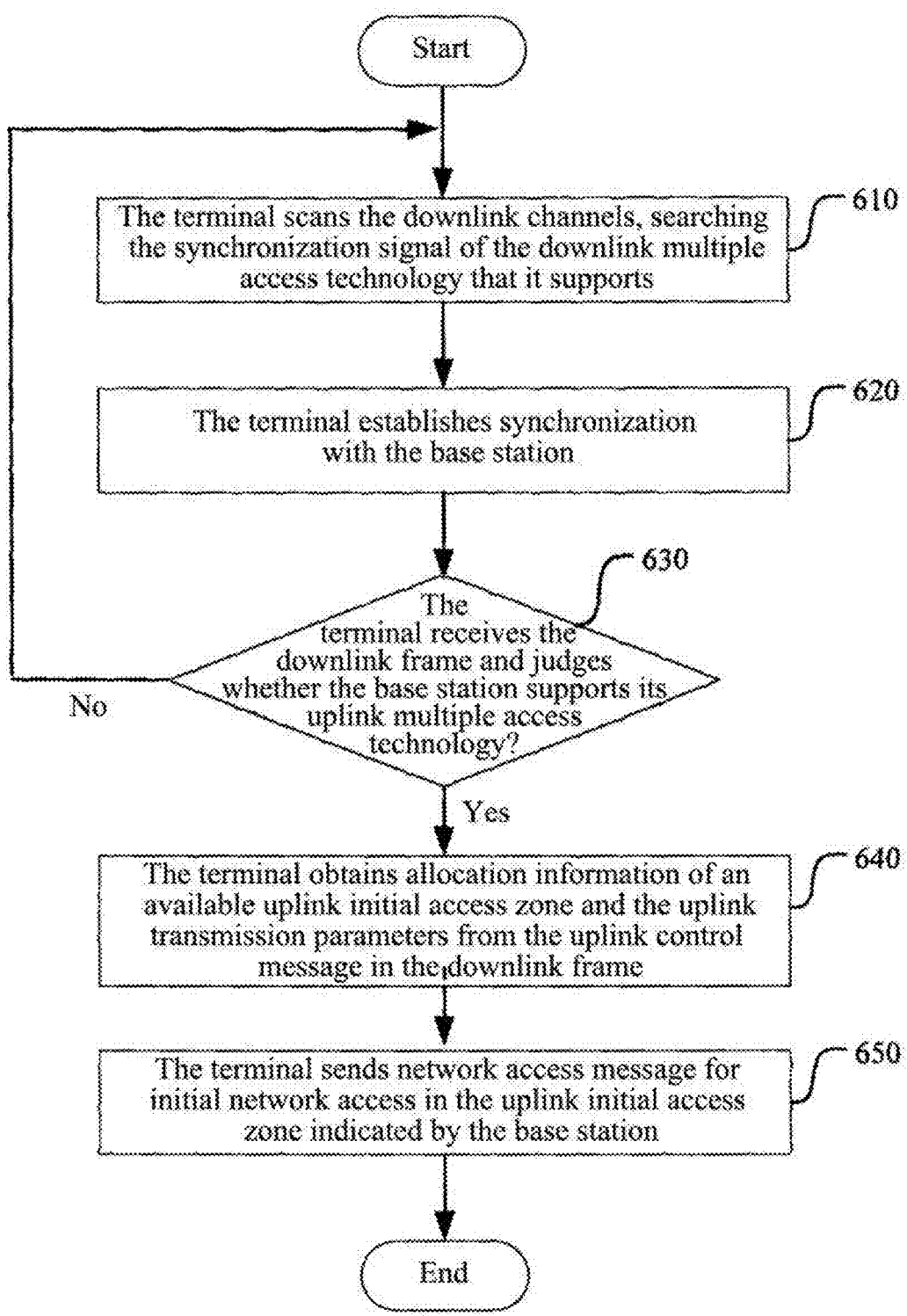
FIG. 6 is a flow chart of the initial network access of the terminal in the system applying the second embodiment.

Process of the initial network access of the terminal is shown as FIG. 6, which comprises the following steps:

Step 610, the terminal searches the synchronization signal of the downlink multiple access technology supported by the terminal;

The base station may use the following methods to send synchronization signals of different multiple access technologies: said base station sends the synchronization signal of each downlink multiple access technology in the synchronization channel of each downlink multiple access zone; or said base station sends in the common synchronization zone of the downlink frame the synchronization signals to the terminals of all the downlink multiple access technologies that the base station supports, and the synchronization signal of each downlink multiple access technology corresponds to one downlink multiple access zone.

Terminal #1 and terminal #2 scan their own downlink channels respectively, searching the synchronization signals that they support. As shown in FIG. 5, terminal #1 supporting downlink OFDMA searches downlink preamble, while terminal #2 supporting downlink SC-FDMA searches downlink synchronization channel.

Step 620, the terminal establishes synchronization with the base station;

Step 630, after the terminal synchronizes with the base station, it receives the downlink frame sent by the base station and determines whether the base station supports its uplink multiple access technology or not, and if yes, proceeds to step 640, otherwise, returns to step 610;

Step 640, the terminal obtains the allocation information of the initial access zone of the downlink multiple access zone the terminal supports and the uplink transmission parameters from the uplink control message;

If the base station supports two uplink multiple access technologies, the terminal needs to determine whether the base station supports its uplink multiple access technology after synchronizing with the base station; and if the base station supports only one uplink multiple access technology, after the terminal accesses to the network, the base station considers by default that the multiple access technology applied by the terminal is the same as that supported by the base station.

Step 650, the terminal sends network access message for initial network access in said uplink initial network access zone according to the allocation information of the initial access zone.

Terminal #1 and terminal #2 use their own technologies to perform initial network access in uplink multiple access zone #1 and uplink multiple access zone #2 respectively.

The general flow of the above processing by the terminal is identical with that shown in FIG. 2, yet the detailed processing of terminal #1 and terminal #2 are different since they support different downlink and uplink multiple access technologies.

Figure 7:
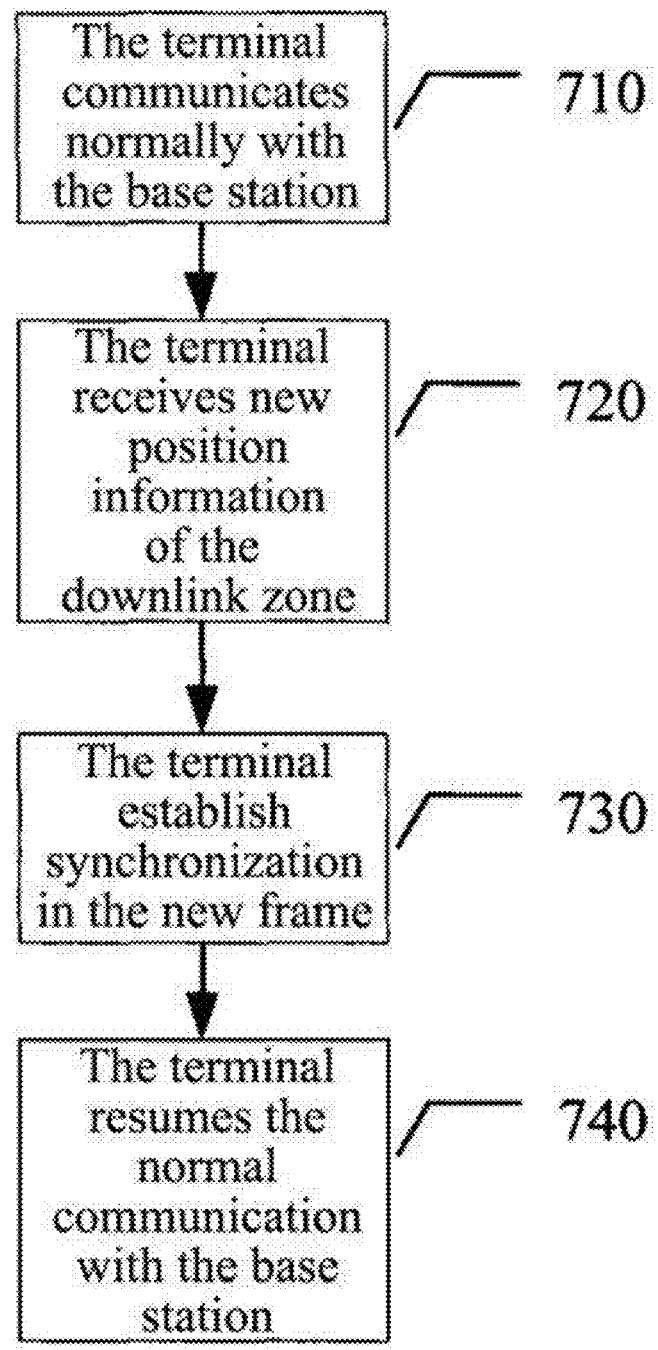
FIG. 7 is a flow chart of the synchronization of the terminal when the position of the downlink multiple access zone changes in the system applying the second embodiment.

If the position of the downlink multiple access zone supported by the terminal changes during the process of normal communication with the base station in the system, the terminal needs to re-establish synchronization with the base station, as shown in FIG. 7, and the process comprise the following steps:

Step 710, the terminal communicates normally with the base station;

Step 720, the terminal receives downlink control message from the base station, and the message indicates the information of the position change of the downlink multiple access zone in a subsequent frame, including the new position of the downlink multiple access zone in the downlink frame and the frame where the change happens;

Step 730, the terminal searches synchronization signal in the frame where the change happens according to the indication and obtains synchronization;

Step 740, the terminal and base station enter the status of normal communication.

After the terminal accesses to the network, the process of receiving downlink data is as follows:

Step 1, the terminal receives the downlink frame sent by the base station, and obtains downlink control message from the corresponding downlink multiple access zone, thus obtains the resource allocation information of the downlink multiple access zone;

The downlink multiple access technology used in the downlink multiple access zone is supported by the terminal. If the downlink control message received by the terminal indicates the information of the position change of the downlink multiple access zone in a subsequent frame, the terminal will perform the synchronization signal searching, synchronization and downlink receiving at the new position in the subsequent frame.

Step 2, the terminal receives data sent from the base station in downlink according to the resource allocation information of the downlink multiple access zone.

After the terminal accesses to the network, the process of sending data in uplink is shown as follows:

Step 1, the terminal receives the uplink control message sent by the base station in the corresponding downlink multiple access zone in the downlink frame, and obtains position information and resource allocation information of the uplink multiple access zone corresponding to the downlink multiple access zone;

The downlink multiple access technology used in the downlink multiple access zone and the uplink multiple access technology used in the corresponding uplink multiple access zone are supported by the terminal.

Step 2, the terminal sends data in an available uplink burst or slot of the uplink multiple access zone according to the resource allocation information of the uplink multiple access zone.

THE THIRD EMBODIMENT

In this embodiment, the base station supports downlink OFDMA and downlink MC-TD-SCDMA, uplink OFDMA, uplink SC-FDMA and uplink MC-TD-SCDMA. Terminal #1 supports downlink OFDMA and uplink OFDMA; terminal #2 supports downlink OFDMA and uplink SC-FDMA; and terminal #3 supports downlink MC-TD-SCDMA (Multi-carrier Time Division Synchronous Code Division Multiple Access) and uplink MC-TD-SCDMA.

Figure 8:
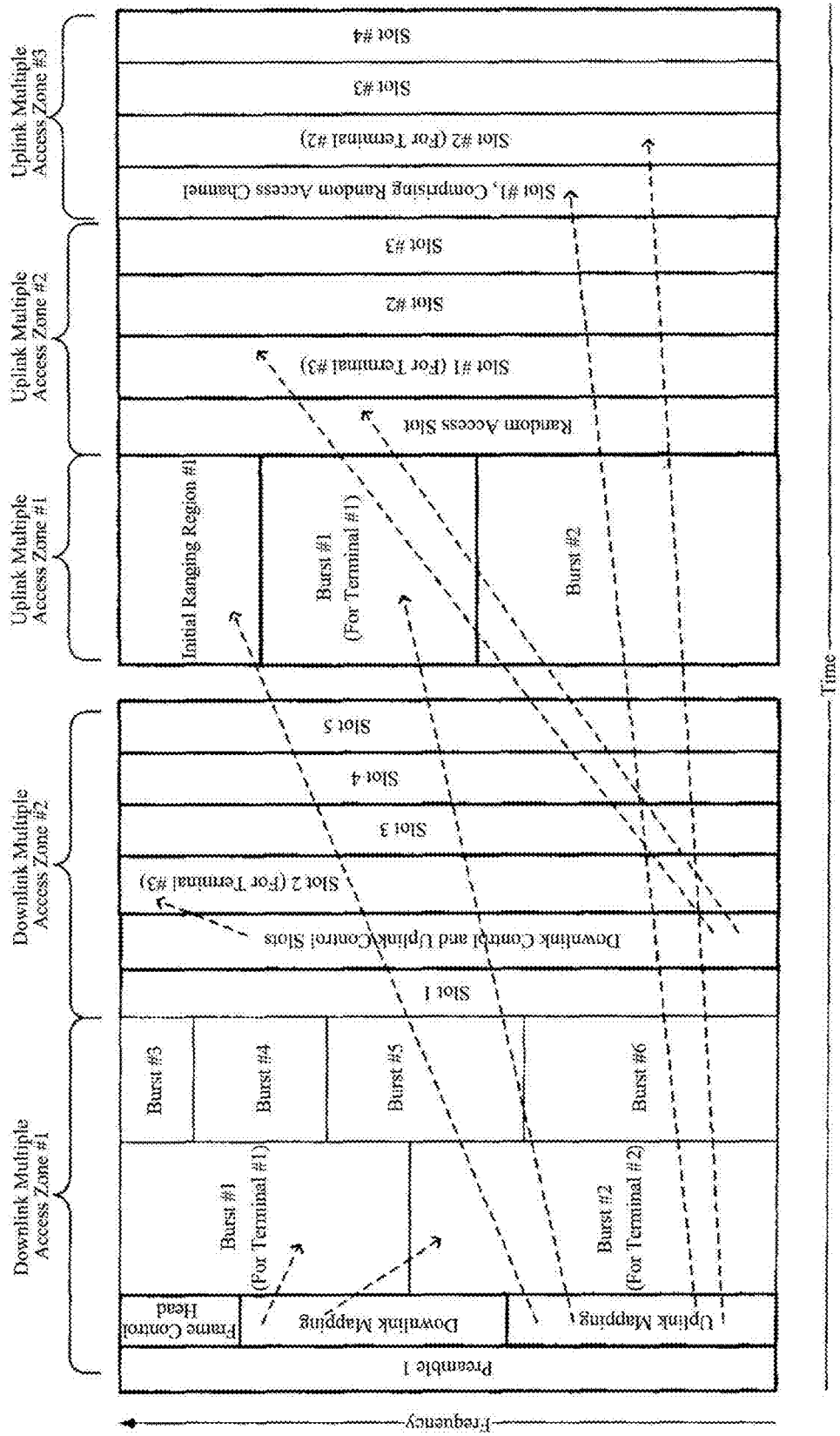
FIG. 8 is a schematic drawing of the frame structure in the system for implementing the third embodiment.

The frame structure to implement this embodiment is shown in FIG. 8, wherein terminal #1 communicates with the base station through downlink multiple access zone #1 and uplink multiple access zone #1, terminal #2 communicates with the base station through downlink multiple access zone #1 and uplink multiple access zone #3, and terminal #3 communicates with the base station through downlink multiple access zone #2 and uplink multiple access zone #2.

The base station sends preamble #1 and synchronization slot #1 (Sync Slot 1) at the beginning of downlink multiple access zone #1 and downlink multiple access zone #2 respectively to support the initial network search and synchronization of the terminals supporting downlink OFDMA and downlink MC-TD-SCDMA respectively.

The base station sends synchronization signals of different multiple access technologies with the following method: the base station sends the synchronization signal of each downlink multiple access technology in the synchronization channel of each downlink multiple access zone; or the base station sends in the common synchronization zone of the downlink frame the synchronization signals to the terminals of all the downlink multiple access technologies that the base station supports, and the synchronization signal of each downlink multiple access technology corresponds to a downlink multiple access zone.

The base station sends in downlink multiple access zone #1 the downlink control message DL-MAP of the downlink multiple access zone and uplink control message UL-MAP of uplink multiple access zone #1 and uplink multiple access zone #3 corresponding to the downlink multiple access zone. The downlink control message comprises resource allocation information of the downlink multiple access zone. As shown in the drawing, the base station uses downlink control message DL-MAP to allocate burst #1 and burst #2 respectively to terminal #1 and terminal #2 supporting OFDMA in downlink multiple access zone #1. Moreover, the base station use downlink control message DL-MAP to allocate bursts 3~6 to other terminals supporting downlink OFDMA.

As shown in FIG. 8, the base station sends in the uplink control message of downlink multiple access zone #1 the position information, resource allocation information and the allocation information of the initial access zone of uplink multiple access zone #1 and uplink multiple access zone #3. In uplink multiple access zone #1, the base station allocates burst #1 to terminal #1 for uplink transmission, in uplink multiple access zone #3, the base station allocates slot #2 to terminal #2 for uplink transmission. As shown in FIG. 8, the base station allocates in the uplink control message of downlink multiple access zone #1 the initial access zones to uplink multiple access zone #1 and uplink multiple access zone #3 corresponding to the downlink multiple access zone. The initial access zone in uplink multiple access zone #1 is configured to support the terminal of uplink OFDMA, such as the initial network access of terminal #1, and the random access channel in slot #1 of uplink multiple access zone #3 is used by terminal #2 for initial network access.

As shown in FIG. 8, the base station sends the downlink control message and the uplink control message in downlink and uplink control slots of downlink multiple access zone #2, and the messages comprise respectively the control information of the downlink multiple access zone and that of the corresponding uplink multiple access zone #2. The base station allocates downlink slot #2 in downlink multiple access zone #2 to terminal #3 and allocates uplink slot #1 in uplink multiple access zone #2 to terminal #3, and the allocation of the random access slot is included in uplink multiple access zone #2.

The description above is just preferred embodiments of the present invention and is not to limit the present invention. For those skilled in the art, the present invention may have all kinds of modifications and variations. Without departing from the spirit and essence of the present invention, any kind of modification, equivalent substitution or improvement should fall into the scope of the claims of the present invention.

For example, the base station may send synchronization signals of all the downlink multiple access technologies that it supports at the beginning of the downlink frame, or send in the synchronization channel the synchronization signals for the downlink multiple access technologies that it supports.

INDUSTRIAL APPLICABILITY

The present invention may be applied in the field of wireless communication to implement supporting different multiple access technologies with the same carrier frequency.

What is claimed is:

1. A method for access of a terminal in a system supporting a plurality of multiple access technologies, comprising the following steps:
   (a) a base station sending a downlink frame comprising at least one downlink multiple access zone, wherein each downlink multiple access zone supports one downlink multiple access technology, and each downlink multiple access zone associates with one or more uplink multiple access zones, and an uplink control message of each downlink multiple access zone comprises information of an uplink multiple access technology supported by the associated uplink multiple access zone and allocation information of a corresponding initial access zone, and an uplink frame is divided into at least two uplink multiple access zones supporting different uplink multiple access technologies;
   (b) the terminal scanning downlink channels, searching synchronization signal of the downlink multiple access technology supported by the terminal, and after establishing synchronization with the base station, obtaining the uplink control message from the corresponding downlink multiple access zone, and according to the information within the message, determining that there is the uplink multiple access technology supported by the terminal, and performing initial network access according to the information of the initial access zone indicated in the uplink control message, otherwise rescanning the channels.

2. A method of claim 1, wherein,
said uplink multiple access zones and downlink multiple access zones are divided according to time division or frequency division, and the uplink control message of each downlink multiple access zone further comprises information of the position and/or size of the associated uplink multiple access zone; and that said downlink multiple access zone associates with an uplink multiple access zone, refers to that there is a terminal which simultaneously supports the downlink multiple access technology corresponding to the downlink multiple access zone and the uplink multiple access technology corresponding to the associated uplink multiple access zone.

3. A method of claim 2, wherein,
said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame.

4. A method of claim 2, wherein,
the allocation information of the initial access zone corresponding to said uplink multiple access zone comprises one or any combination of the following: position of the initial access zone, size of the initial access zone and type of the uplink multiple access technology supported by the initial access zone.

5. A method of claim 2, wherein,
if said downlink frame comprises a plurality of downlink multiple access zones, the relative position of each downlink multiple access zone is variable;
when the position of a downlink multiple access zone needs to be changed, the base station sends in advance the position change information, including the new position of the downlink multiple access zone in the frame and the frame where the change happens, in the downlink control message of the corresponding downlink multiple access zone;
the terminal communicates normally with the base station, and after the terminal receives the downlink control message of the downlink multiple access zone which contains the information to indicate the position change of the downlink multiple access zone in a subsequent frame, the terminal searches the synchronization signal in the frame in which the new downlink multiple access zone is located according to the indication and resumes the normal communication with the base station after the synchronization.

6. A method of claim 2, wherein,
said base station sends the synchronization signal of each downlink multiple access technology in the synchronization channel of each downlink multiple access zone; or
said base station sends synchronization signals to terminals of all the downlink multiple access technologies in the common synchronization zone of the downlink frame, and the synchronization signal of each downlink multiple access technology corresponds to a downlink multiple access zone.

7. A method of claim 2, wherein,
said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

8. A method of claim 1, wherein,
said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame.

9. A method of claim 1, wherein,
the allocation information of the initial access zone corresponding to said uplink multiple access zone comprises one or any combination of the following: position of the initial access zone, size of the initial access zone and type of the uplink multiple access technology supported by the initial access zone.

10. A method of claim 9, wherein,
terminals applying different uplink multiple access technologies use different initial access zones to perform the access, and each initial access zone is located in the corresponding uplink multiple access zone; or
the initial access zone is located in the common zone of the uplink frame, and terminals applying a plurality of uplink multiple access technologies perform the access by using the same initial access zone.

11. A method of claim 1, wherein,
if said downlink frame comprises a plurality of downlink multiple access zones, the relative position of each downlink multiple access zone is variable;
when the position of a downlink multiple access zone needs to be changed, the base station sends in advance the position change information, including the new position of the downlink multiple access zone in the frame and the frame where the change happens, in the downlink control message of the corresponding downlink multiple access zone;
the terminal communicates normally with the base station, and after the terminal receives the downlink control message of the downlink multiple access zone which contains the information to indicate the position change of the downlink multiple access zone in a subsequent frame, the terminal searches the synchronization signal in the frame in which the new downlink multiple access zone is located according to the indication and resumes the normal communication with the base station after the synchronization.

12. A method of claim 1, wherein,
said base station sends the synchronization signal of each downlink multiple access technology in the synchronization channel of each downlink multiple access zone; or
said base station sends synchronization signals to terminals of all the downlink multiple access technologies in the common synchronization zone of the downlink frame, and the synchronization signal of each multiple access technology corresponds to a downlink multiple access zone.

13. A method of claim 1, wherein,
said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

14. A method for the system supporting a plurality of multiple access technologies to implement downlink transmission, comprising the following steps:
(a) a base station sending a downlink frame comprising at least one downlink multiple access zone, wherein each downlink multiple access zone supports transmission with one downlink multiple access technology, and each downlink multiple access zone associates with one or more uplink multiple access zones, and an uplink control message of each downlink multiple access zone comprises information of the associated uplink multiple access zone, and a downlink control message of each downlink multiple access zone comprises resource allocation information of the zone, and an uplink frame is divided into at least two uplink multiple access zones supporting different uplink multiple access technologies;
(b) after accomplishing initial access, a terminal obtaining the downlink control message from the downlink multiple access zone corresponding to the downlink multiple access technology supported by the terminal, and receiving data sent by the base station in downlink according to the resource allocation information in the message.

15. A method of claim 14, wherein,
said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame, and said uplink multiple access zones and downlink multiple access zones are divided according to time division or frequency division;
that said downlink multiple access zone associate with an uplink multiple access zone, refers to that there is a terminal which simultaneously supports the downlink multiple access technology corresponding to the downlink multiple access zone and the uplink multiple access technology corresponding to the associated uplink multiple access zone.

16. A method of claim 15, wherein,
besides the resource allocation information of the zone, the downlink control message of each downlink multiple access zone further comprises position information and/or downlink transmission parameters of the downlink multiple access zone, and said resource allocation information further comprises one or any combination of the following parameters: positions, size, types, target addresses and transmission parameters of the downlink resource blocks, wherein the target address is used to indicate the terminal which receive data in the downlink resource block.

17. A method of claim 15, wherein,
if said downlink frame comprises a plurality of downlink multiple access zones, the relative position of each downlink multiple access zone is variable; and when the position of a downlink multiple access zone needs to be changed, the base station sends in advance the position change information, including the new position of the downlink multiple access zone in the frame and the frame where the change happens, in the downlink control message of the corresponding downlink multiple access zone; and after receiving the downlink control message of the downlink multiple access zone which contains the information to indicate the position change of the downlink multiple access zone in a subsequent frame, the terminal searches synchronization signal in the frame in which the new downlink multiple access zone is located according to the indication, and resumes the normal communication with the base station after the synchronization.

18. A method of claim 14, wherein, besides the resource allocation information of the zone, the downlink control message of each downlink multiple access zone further comprises position information and/or downlink transmission parameters of the downlink multiple access zone, and said resource allocation information further comprises one or any combination of the following parameters: positions, size, types, target addresses and transmission parameters of the downlink resource blocks, wherein the target address is used to indicate the terminal which receive data in the downlink resource block.

19. A method of claim 18, wherein, said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

20. A method of claim 14, wherein, if said downlink frame comprises a plurality of downlink multiple access zones, the relative position of each downlink multiple access zone is variable; and when the position of a downlink multiple access zone needs to be changed, the base station sends in advance the position change information, including the new position of the downlink multiple access zone in the frame and the frame where the change happens, in the downlink control message of the corresponding downlink multiple access zone; and after receiving the downlink control message of the downlink multiple access zone which contains the information to indicate the position change of the downlink multiple access zone in a subsequent frame, the terminal searches synchronization signal in the frame in which the new downlink multiple access zone is located according to the indication, and resumes the normal communication with the base station after the synchronization.

21. A method of claim 15, wherein, said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

22. A method for the system supporting a plurality of multiple access technologies to implement uplink transmission, comprising the following steps:

(a) a base station sending a downlink frame comprising at least one downlink multiple access zone, wherein each downlink multiple access zone supports transmission with one downlink multiple access technology, and each downlink multiple access zone associates with one or more uplink multiple access zones, and an uplink control message of each downlink multiple access zone comprises resource allocation information of the associated uplink multiple access zone, and an uplink frame is divided into at least two uplink multiple access zones supporting different uplink multiple access technologies;

(b) after accomplishing initial access, a terminal obtaining the uplink control message from the downlink multiple access zone corresponding to the downlink multiple access technology supported by the terminal, and uses the uplink multiple access technology of the terminal to perform uplink transmission in an available resource block according to the resource allocation information within the message.

23. A method of claim 22, wherein, said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame;

that said downlink multiple access zone associates with an uplink multiple access zone, refers to that there is a terminal which simultaneously supports the downlink multiple access technology corresponding to the downlink multiple access zone and the uplink multiple access technology corresponding to the associated uplink multiple access zone.

24. A method of claim 23, wherein, besides the resource allocation information of the associated uplink multiple access zone, said uplink control message further comprises one or any combination of the following information of the associated uplink multiple access zone: information of the uplink multiple access technology supported, position and size, wherein said resource allocation information comprises one or any combination of the following parameters: positions, size, types, target addresses and transmission parameters of the uplink resource blocks, and the target address is used to indicate the terminal which implement uplink transmission in the uplink resource block.

25. A method of claim 23, wherein, the relative positions of the plurality of uplink multiple access zones in said uplink frame are variable;

when the position of an uplink multiple access zone needs to be changed, the base station sends the position change information of the uplink multiple access zone in the uplink control message of the corresponding downlink multiple access zone, indicating the new position of the uplink multiple access zone in the current frame;

after receiving the new position information of the uplink multiple access zone in the current frame indicated in the uplink control message of the downlink multiple access zone, the terminal sends uplink signals in the new uplink multiple access zone.

26. A method of claim 23, wherein, said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

27. A method of claim 22, wherein,
besides the resource allocation information of the associated uplink multiple access zone, said uplink control message further comprises one or any combination of the following information of the associated uplink multiple access zone: information of the uplink multiple access technology supported, position and size, wherein said resource allocation information comprises one or any combination of the following parameters: positions, size, types, target addresses and transmission parameters of the uplink resource blocks, and the target address is used to indicate the terminal which implement uplink transmission in the uplink resource block.

28. A method of claim 22, wherein,
the relative positions of the plurality of uplink multiple access zones in said uplink frame are variable;
when the position of an uplink multiple access zone needs to be changed, the base station sends the position change information of the uplink multiple access zone in the uplink control message of the corresponding downlink multiple access zone, indicating the new position of the uplink multiple access zone in the current frame;
after receiving the new position information of the uplink multiple access zone in the current frame indicated in the uplink control message of the downlink multiple access zone, the terminal sends uplink signals in the new uplink multiple access zone.

29. A method of claim 22, wherein,
said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

30. A system frame structure for supporting a plurality of multiple access technologies, comprising a downlink frame and an uplink frame, said downlink frame comprising at least one downlink multiple access zone, each downlink multiple access zone supporting one downlink multiple access technology, said uplink frame comprising at least two uplink multiple access zones supporting different uplink multiple access technologies, and each downlink multiple access zone associating with one or more uplink multiple access zones.

31. A system frame structure of claim 30, wherein,
said downlink frame comprises one downlink multiple access zone which associates with a plurality of uplink multiple access zones in the uplink frame; or said downlink frame comprises at least two downlink multiple access zones, each of which associates with one or more uplink multiple access zones in the uplink frame;
said downlink multiple access zone associating with an uplink multiple access zone, refers to that there is a terminal which simultaneously supports the downlink multiple access technology corresponding to the downlink multiple access zone and the uplink multiple access technology corresponding to the associated uplink multiple access zone, and an uplink control message of each downlink multiple access zone comprises information of the associated uplink multiple access zone.

32. A system frame structure of claim 31, wherein,
said uplink frame further comprises initial access zones, and an initial access zone is located in a corresponding uplink multiple access zone, or the initial access zone is located in the common zone of the uplink frame.

33. A system frame structure of claim 31, wherein,
information of the associated uplink multiple access zone in said uplink control message comprises one or any combination of the following information: allocation information of the corresponding initial access zone, information of the uplink multiple access technology supported, position, size, transmission parameters and resource allocation information of the associated uplink multiple access zone, wherein the resource allocation information comprises one or any combination of the following parameters: positions, size, target addresses and transmission parameters of the uplink resource blocks, and the target address is used to indicate a terminal which implement uplink transmission in the uplink resource block.

34. A system frame structure of claim 31, wherein,
said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

35. A system frame structure of claim 31, wherein,
a synchronization channel of each downlink multiple access zone comprises synchronization signal of the corresponding downlink multiple access technology; or a common synchronization channel zone of the downlink frame comprises synchronization signals of all the downlink multiple access technologies, and the synchronization signal of each downlink multiple access technology corresponds to a downlink multiple access zone.

36. A system frame structure of claim 30, wherein,
said uplink frame further comprises initial access zones, and an initial access zone is located in a corresponding uplink multiple access zone, or the initial access zone is located in the common zone of the uplink frame.

37. A system frame structure of claim 30, wherein,
information of the associated uplink multiple access zone in said uplink control message comprises one or any combination of the following information: allocation information of the corresponding initial access zone, information of the uplink multiple access technology supported, position, size, transmission parameters and resource allocation information of the associated uplink multiple access zone, wherein the resource allocation information comprises one or any combination of the following parameters: positions, size, target addresses and transmission parameters of the uplink resource blocks, and the target address is used to indicate a terminal which implement uplink transmission in the uplink resource block.

38. A system frame structure of claim 30, wherein,
said downlink multiple access technologies comprise one or more of the following: orthogonal frequency division multiple access, single carrier frequency division multiple access and multi-carrier time division synchronous code division multiple access; and said uplink multiple access technologies comprise at least two of the following: orthogonal frequency division multiple access, single carrier frequency division multiple access and multi-carrier time division synchronous code division multiple access.

39. A system frame structure of claim 30, wherein,
a synchronization channel of each downlink multiple access zone comprises synchronization signal of the corresponding downlink multiple access technology; or a common synchronization channel zone of the downlink frame comprises synchronization signals of all the downlink multiple access technologies, and the synchronization signal of each downlink multiple access technology corresponds to a downlink multiple access zone.

40. A system for supporting a plurality of multiple access technologies, comprising a base station and a terminal, wherein,
said base station is configured to send a downlink frame comprising at least one downlink multiple access zone, and each downlink multiple access zone supports transmission with one downlink multiple access technology, and each downlink multiple access zone associates with one or more uplink multiple access zones, and an uplink control message of each downlink multiple access zone comprises information of an uplink multiple access technology supported by the associated uplink multiple access zone, allocation information of a corresponding initial access zone, and resource allocation information of the uplink multiple access zone associated with the downlink multiple access zone, a downlink control message of each downlink multiple access zone comprises resource allocation information of the downlink multiple access zone, and an uplink frame is divided into at least two uplink multiple access zones supporting different uplink multiple access technologies;
said terminal is configured to scan downlink channels, searching synchronization signal of the downlink multiple access technology supported by the terminal, and after establishing synchronization with the base station, to obtain the uplink control message from the corresponding downlink multiple access zone, and if the terminal determines that the system supports the uplink multiple access technology of the terminal according to the information in the uplink control message, the terminal performs initial network access according to the information of the initial access zone indicated in the uplink control message, and then obtains the downlink control message and the uplink control message from the downlink multiple access zone corresponding to the downlink multiple access technology supported by the terminal, and receives the data sent from the base station in downlink according to the resource allocation information in the message, and performs uplink transmission in an available resource block by using the uplink multiple access technology of the terminal.

41. A system of claim 40, wherein,
said downlink frame sent by the base station comprises one downlink multiple access zone which associates with a plurality of uplink multiple access zones in the uplink frame; or said downlink frame sent by the base station comprises at least two downlink multiple access zones, each of which associates with one or more uplink multiple access zones in the uplink frame, said uplink multiple access zones and downlink multiple access zones are divided according to time division or frequency division;
that said downlink multiple access zone associates with an uplink multiple access zone, refers to that there is a terminal which simultaneously supports the downlink multiple access technology corresponding to the downlink multiple access zone and the uplink multiple access technology corresponding to the associated uplink multiple access zone.

42. A system of claim 40, wherein,
when the base station needs to change the position of a downlink multiple access zone, the base station sends in advance the position change information in the downlink control message of the corresponding downlink multiple access zone, and the information comprises the new position of the downlink multiple access zone in the frame and the frame where the change happens;
the terminal communicates normally with the base station, and after receiving the downlink control message of the downlink multiple access zone which contains the information to indicate the position change of the downlink multiple access zone in a subsequent frame, the terminal searches the synchronization signal in the frame in which the new downlink multiple access zone is located according to the indication, and resumes the normal communication with the base station after the synchronization.

43. A system of claim 40, wherein,
said base station sends the synchronization signal of each downlink multiple access technology in a synchronization channel of each downlink multiple access zone; or the base station sends synchronization signals to terminals of all the downlink multiple access technologies in a common synchronization zone of the downlink frame, and the synchronization signal of each downlink multiple access technology corresponds to a downlink multiple access zone.

44. A system of claim 40, wherein,
in the allocation information of the initial access zone in the uplink control message of each downlink multiple access zone of the base station, each uplink multiple access zone comprises one initial access zone, or the initial access zone is located in a common zone of the uplink frame, and terminals applying a plurality of uplink multiple access technologies can perform the access by using the same initial access zone.

45. A system of claim 40, wherein,
said downlink multiple access technologies supported by the downlink multiple access zones in the downlink frame sent by the base station comprise one or more of the following: orthogonal frequency division multiple access, single carrier frequency division multiple access and multi-carrier time division synchronous code division multiple access; and said uplink multiple access technologies supported by the uplink multiple access zones in the received uplink frame comprise at least two of the following: orthogonal frequency division multiple access, single carrier frequency division multiple access and multi-carrier time division synchronous code division multiple access.

* * * * *